United States Patent
Nishikawa et al.

[19]

[11] Patent Number: 6,054,092
[45] Date of Patent: Apr. 25, 2000

[54] METHOD OF MANUFACTURING HOLLOW BODIES AND METHOD OF MANUFACTURING RESINOUS CONTAINERS

[75] Inventors: Makoto Nishikawa; Takuji Hikosaka, both of Toyohashi; Kouichi Jinno, Hamamatsu, all of Japan

[73] Assignee: Asmo Co., Ltd., Japan

[21] Appl. No.: 09/110,464

[22] Filed: Jul. 7, 1998

[30] Foreign Application Priority Data

Jul. 15, 1997 [JP] Japan .................................. 9-190129

[51] Int. Cl.⁷ .................................................. B29C 49/20
[52] U.S. Cl. .......................................... 264/516; 264/515
[58] Field of Search ..................................... 264/515, 516, 264/536, 540

[56] References Cited

U.S. PATENT DOCUMENTS

| | | | |
|---|---|---|---|
| 3,534,435 | 10/1970 | John | 264/540 |
| 5,061,417 | 10/1991 | Schurman | 264/536 |
| 5,523,047 | 6/1996 | Corby et al. | 264/536 |
| 5,534,218 | 7/1996 | Daubenbuchel et al. | 264/516 |
| 5,575,969 | 11/1996 | Yamamori et al. | 264/516 |
| 5,885,517 | 3/1999 | Hendrickson et al. | 264/536 |

FOREIGN PATENT DOCUMENTS

| | | | |
|---|---|---|---|
| 1344169 | 10/1963 | France | 264/540 |
| 59-020630 | 2/1984 | Japan | 264/540 |
| 7-25380 | 3/1995 | Japan . | |

*Primary Examiner*—Catherine Timm
*Attorney, Agent, or Firm*—Parkhurst & Wendel, L.L.P.

[57] ABSTRACT

The present invention provides a method of manufacturing resinous containers comprising: a preparing process in which segmental molding dies are prepared, the segmental molding dies comprising a first cavity for molding hollow bodies and a second cavity for molding auxiliary parts and a third cavity for holding the auxiliary part which communicates with the first cavity; a pre-molding process in which a resin parison is supplied between the segmental molding dies, the segmental molding dies are clamped, a compressed gas is blown into the resin parison to expand the resin parison within the first cavity and to fit the resin parison to the surface which forms an outline of the first cavity, of the segmental molding dies, the compressed gas is discharged from the resin parison, and the segmental molding dies are opened to take out a formed hollow body and a formed auxiliary part; and a main molding process in which the same process as the pre-molding process is implemented except that the formed auxiliary part is inserted in the third cavity before the resin parison is supplied between the segmental molding dies and that a new auxiliary part and a resin container in which the inserted auxiliary part is integrated with a hollow body are taken out. In the present invention, when once the pre-molding process is implemented, the preparing process and the main molding process are repeated.

10 Claims, 9 Drawing Sheets

F I G. 5A
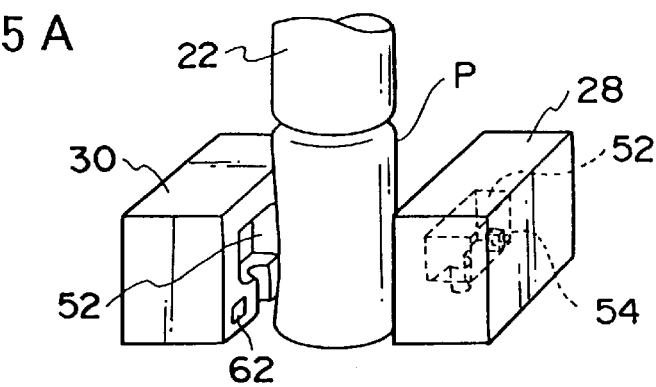
F I G. 5B
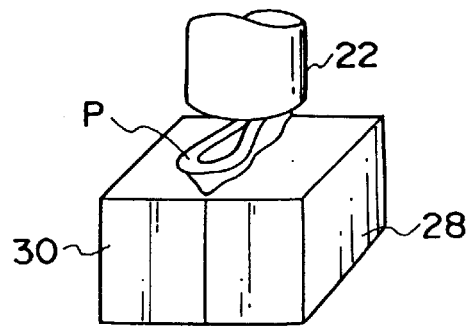
F I G. 5C
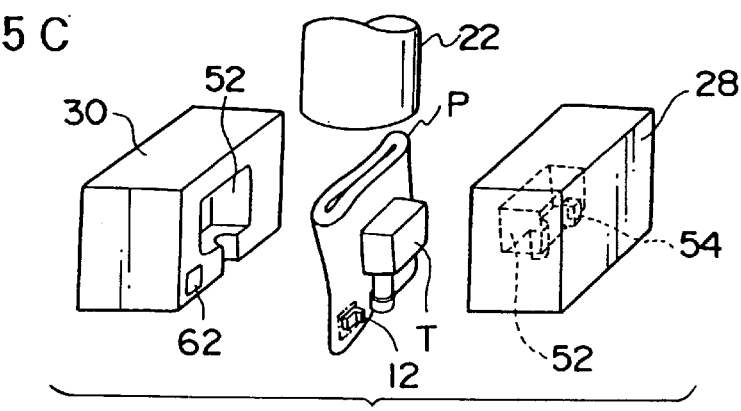
F I G. 5D
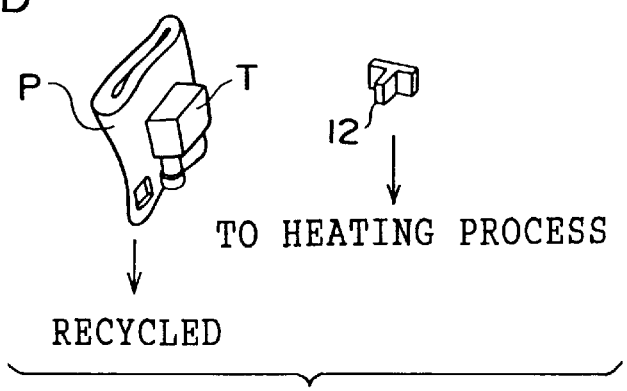
RECYCLED    TO HEATING PROCESS

METHOD OF MANUFACTURING HOLLOW BODIES AND METHOD OF MANUFACTURING RESINOUS CONTAINERS

BACKGROUND OF THE INVENTION

1. Field of the Invention

The present invention relates to a method of manufacturing hollow bodies and a method of manufacturing resinous containers.

2. Description of the Related Art

For example, a washer tank, which is applied to a wiper device of a vehicle and contains a solution such as a window washer solution or the like, is generally manufactured through blow molding. Further, in the washer tank, a bracket to dispose and reliably fix the washer tank onto a vehicle body is integrally fixed to a tank main body.

However, when the bracket is positioned in the direction which is orthogonal to the parting line of a molding die, the tank cannot be manufactured through one step. Therefore, in this case, conventionally, a hollow tank main body is manufactured through blow molding and the bracket is manufactured through a separate process such as injection molding or the like. Further, the molded bracket is thermally melt-adhered (thermally press-adhered) to the tank main body in order to integrate these parts and complete the tank as a product. Alternatively, the bracket is manufactured through the separate process such as injection molding or the like as mentioned above. Thereafter, when the hollow tank main body is manufactured through blow molding, the bracket is insert molded to the tank main body so as to unite the two parts and complete the tank as a product.

In this way, conventionally, because the bracket is manufactured separately from the tank main body in the separate process such as injection molding or the like, a molding die for injection molding and the operation of manufacturing the molding die are indispensable. Moreover, the number of the processes of manufacturing washer tanks and the cost of manufacturing are increased.

Furthermore, after the bracket is integrated with the tank main body to complete the tank as a product, the quality of the product is inspected. Because a material of the bracket, which is manufactured through the separate process such as injection molding or the like as mentioned above, is different from that of the tank main body due to the difference in the manufacturing methods, the product which was determined as defective cannot be recycled without segregating the materials (e.g., the material which is obtained by grinding down the product cannot be used as the molding material of the tank main body). Consequently, such tank has disadvantages on the point of not only high cost but also resources saving (effective utilization and recycling of materials).

SUMMARY OF THE INVENTION

With the aforementioned in view, an object of the present invention is to provide a method of manufacturing hollow bodies and a method of manufacturing resinous containers in which the number of manufacturing processes is reduced, materials can be used effectively, and the cost of manufacturing can be greatly cut down.

The present invention provides a method of manufacturing hollow bodies comprising the steps of: preparing segmental molding dies which comprise a first cavity for molding hollow bodies and a second cavity for molding auxiliary parts provided at a portion other than the first cavity in at least one of the die-matching surfaces of said segmental molding dies; supplying a resin parison between said segmental molding dies; clamping the segmental molding dies to fill said second cavity with said resin parison completely blowing a compressed gas into said resin parison to expand said resin parison within the first cavity to the extent that said resin parison is pressed against the inner surface of said first cavity; discharging said compressed gas from said resin parison; and opening said segmental molding dies to take out a formed hollow body and a formed auxiliary part which are made of said resin parison.

According to the present invention described above, when the hollow bodies are molded in a blow molding process, the auxiliary parts are also molded. Therefore, the number of the processes for manufacturing hollow bodies and auxiliary parts and the cost of manufacturing can be reduced.

Moreover, the present invention provides a method of manufacturing resinous containers comprising: a preparing process in which segmental molding dies are prepared, the segmental molding dies comprising a first cavity for molding hollow bodies and a second cavity for molding auxiliary parts which is provided at a portion other than the first cavity in at least one of the die-matching surfaces of the segmental molding dies and a third cavity for holding an auxiliary part produced in said second cavity during a previous molding cycle which communicates with said first cavity; a pre-molding process in which a resin parison is supplied between said segmental molding dies, said segmental molding dies are clamped, a compressed gas is blown into said resin parison to expand said resin parison within said first cavity to the extent that said resin parison is pressed against the inner surface of said first cavity, said compressed gas is discharged from said resin parison, and said segmental molding dies are opened to take out a formed hollow body and a formed auxiliary part; and a main molding process in which said formed auxiliary part is inserted in said third cavity, the resin parison is supplied between said segmental molding dies, said segmental molding dies are clamped, a compressed gas is blown into said resin parison to expand said resin parison within said first cavity to the extent that said resin parison is pressed against the inner surface of the of the first cavity, of the segmental molding dies, the compressed gas is discharged from the resin parison, and the segmental molding dies are opened to take out a new auxiliary part and a resin container in which the inserted auxiliary part is integrated with a hollow body, wherein once the pre-molding process is implemented, the preparing process and the main molding process are repeated.

According to the present invention described above, when the hollow bodies are molded in a blow molding process, the auxiliary parts are also molded. Therefore, the number of processes required for manufacturing resinous containers can be reduced. Moreover, if the resinous containers in which the body and the auxiliary part are integrated are determined as defective at the time of inspecting the quality thereof, the material obtained by grinding down the resinous containers can be recycled as the resin parison without segregation because the materials of the bodies and the auxiliary parts are the same. Therefore, the material can be used effectively. In addition, the material obtained by grinding down the body formed in the pre-molding process can be utilized as the resin parison. The reduction of the number of manufacturing processes and effective utilization of the material result in the reduction of the manufacturing cost.

BRIEF DESCRIPTION OF THE DRAWINGS

FIGS. 5A through 5D show specific processes of the method of manufacturing resinous containers relating to the embodiment of the present invention and are perspective views of a pre-molding process.

DESCRIPTION OF THE PREFERRED EMBODIMENTS

A manufacturing method of the present invention is basically blow molding. As resinous containers, for example, a washer tank 10 (see FIG. 6D) which is applied to a vehicle wiper device is manufactured. A tank main body 10A of the washer tank 10 can contain a solution such as a window washer solution or the like. Further, a bracket 12 for mounting the washer tank 10 at a vehicle body, which serves as an auxiliary part (auxiliary body), is fixed integrally to a side wall of the washer tank 10 (the tank main body 10A).

Figure 3:
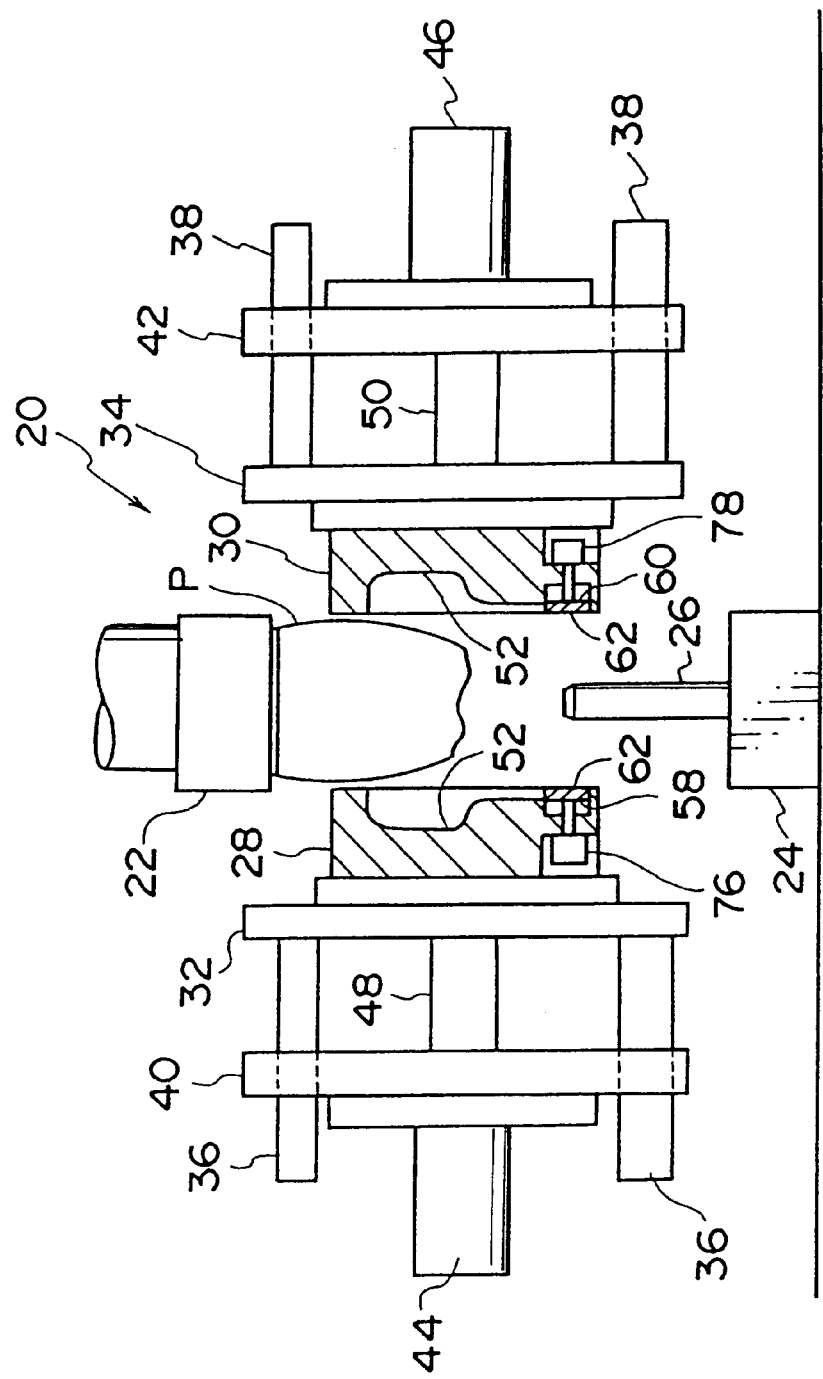
FIG. 3 is a schematic view which shows the structure of a blow molding machine used in the method of manufacturing resinous containers relating to the embodiment of the present invention.

FIG. 3 shows schematically the structure of a blow molding machine 20 which is used at the time of manufacturing the washer tank 10.

The blow molding machine 20 includes a die head 22 and a resin parison P serving as a molding material can be extruded therefrom. A blowing device 24 is disposed directly below the die head 22. A blow pin 26 is stood upright at the blowing device 24 and blows air to the resin parison P. The resin parison P can be thereby expanded.

A pair of segmental molding dies 28 and 30 are disposed on both sides of the resin parison P which has been extruded from the die head 22. The molding die 28 is fixed to a mount 32 and the molding die 30 is fixed to a mount 34, and further, the mount 32 is fixed to the distal end portion of a pair of guide rails 36 and the mount 34 is fixed to the distal end portion of a pair of guide rails 38. The guide rails 36 are parallel to each other and are movably supported by a support 40 and the guide rails 38 are parallel to each other and are movably supported by a support 42. In this way, when the pair of guide rails 36 is moved relative to the support 40 and the pair of guide rails 38 is moved relative to the support 42, the molding dies 28 and 30 can be moved closer to or away from each other while the die-matching surfaces thereof are kept parallel.

Moreover, a hydraulic cylinder 44 is attached to the support 40 and a hydraulic cylinder 46 is attached to the support 42. An actuator rod 48 of the hydraulic cylinder 44 is connected to the mount 32 and an actuator rod 50 of the hydraulic cylinder 46 is connected to the mount 34. Accordingly, when the hydraulic cylinders 44 and 46 are operated, the mounts 32 and 34 are moved closer to or away from each other, thereby moving the molding dies 28 and 30.

The molding dies 28 and 30 will be described in detail hereinafter.

Figure 1:
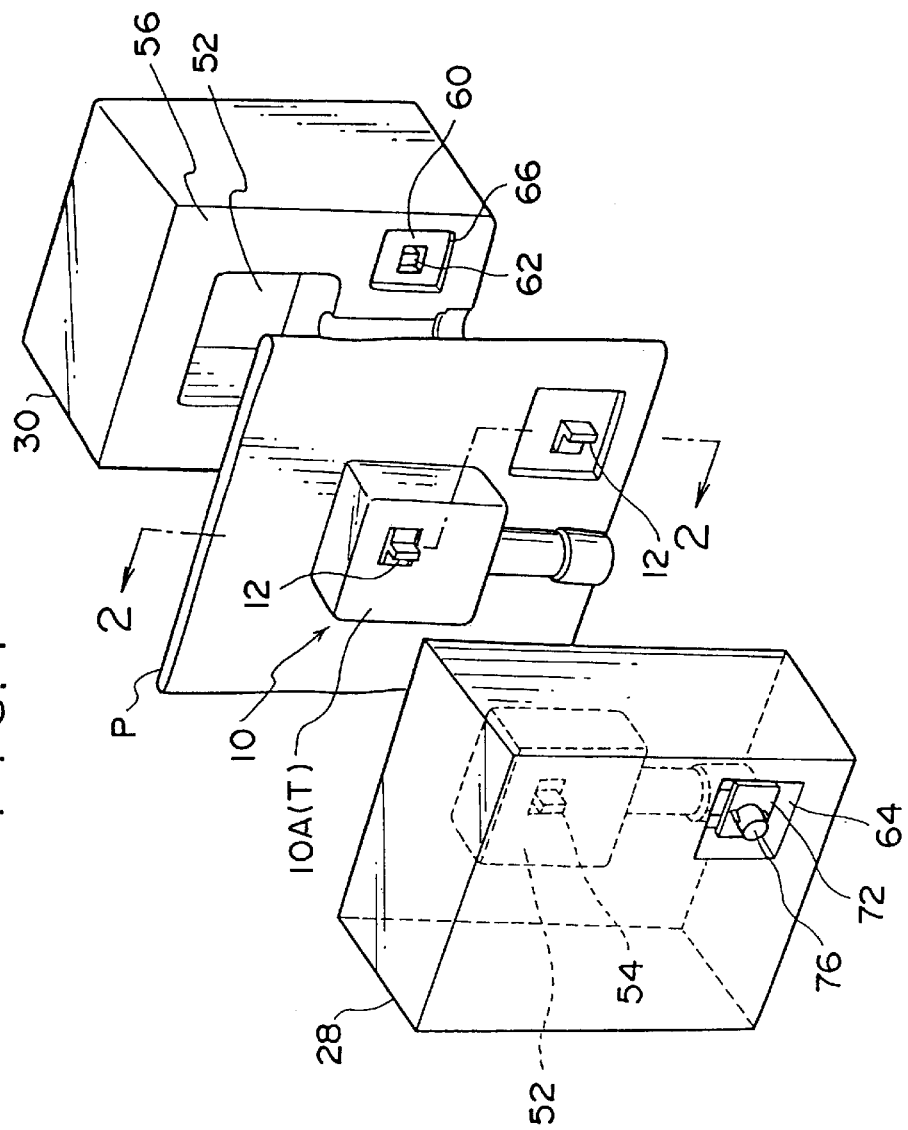
FIG. 1 is a perspective view which shows a principal process of a method of manufacturing resinous containers relating to an embodiment of the present invention.
Figure 2:
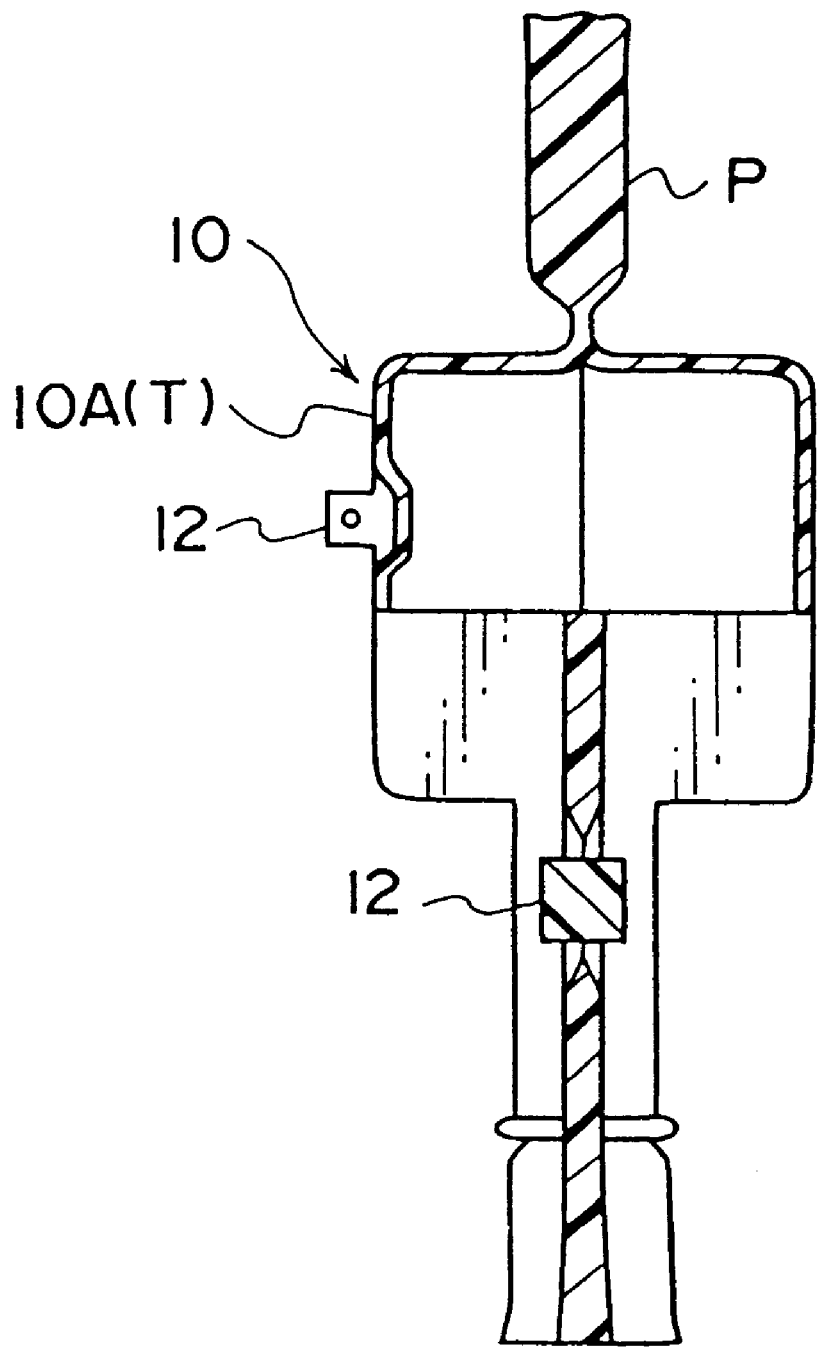
FIG. 2 is a cross-sectional view taken along line 2—2 in FIG. 1.

FIG. 1 shows a perspective view of a principal manufacturing process of a manufacturing method relating to the present embodiment which uses the molding dies 28 and 30. Further, FIG. 2 shows a cross-sectional view taken along line 2—2 in FIG. 1.

A cavity 52 (for molding the tank main body 10A), which corresponds to the shape of the tank main body 10A of the washer tank 10, is provided at each of the die-matching surfaces of the molding dies 28 and 30. The resin parison P is expanded within the cavity 52 and fits the engraved surfaces, which form the outline of the cavity 52, of the molding dies 28 and 30, and the tank main body 10A can be formed.

Moreover, a holding portion (cavity) 54 for accommodating the aforementioned bracket 12 at the time of insert molding is provided at the molding die 28 so that the holding portion 54 communicates with the cavity 52.

Figure 4:
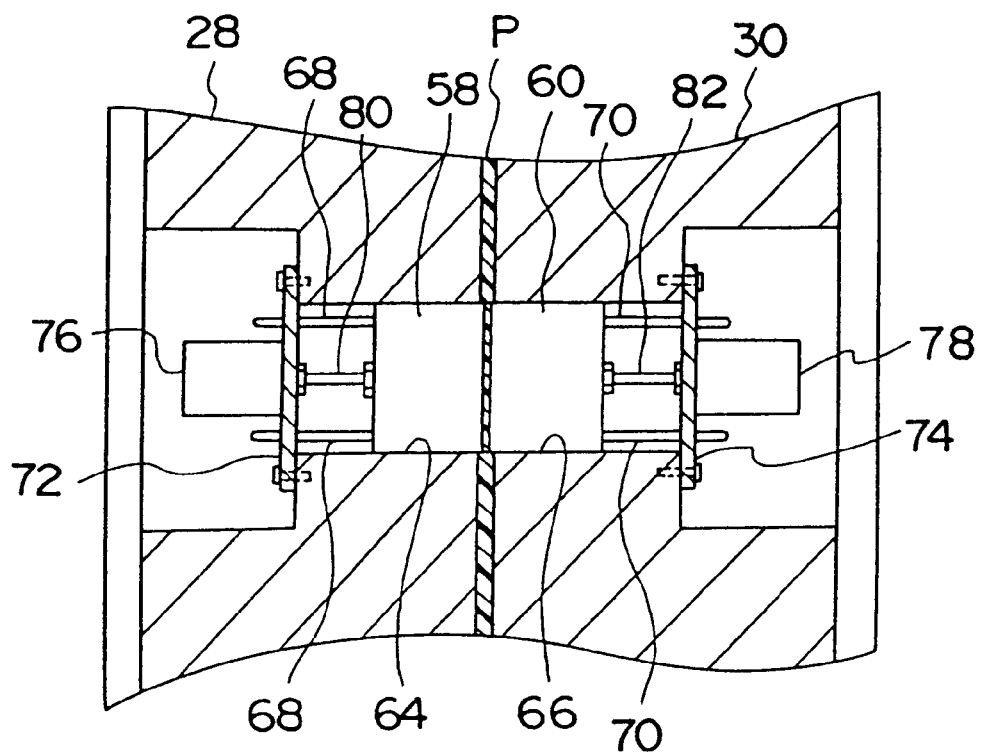
FIG. 4 is a schematic cross-sectional view which shows the structure of an auxiliary molding die of the blow molding machine used in the method of manufacturing resinous containers relating to the embodiment of the present invention.

An auxiliary molding die 58 is provided in a land area 56, which is the area other than the cavity 52 in the die-matching surface, of the molding die 28 and an auxiliary molding die 60 is provided in a land area 56 of the molding die 30. The auxiliary molding dies 58 and 60 mold the bracket 12 serving as the aforementioned auxiliary part (auxiliary body), and a cavity 62 for molding an auxiliary part (hereinafter, "cavity 62"), which corresponds to the shape of the bracket 12, is provided on the surface of each of the molding dies 58 and 60. As shown in FIG. 4, the auxiliary molding die 58 is disposed so as to be movable within a mold opening 64 formed at the molding die 28 and the auxiliary molding die 60 is disposed so as to be movable within a mold opening 66 formed at the molding die 30. Further, the auxiliary molding die 58 is fixed to the distal end portion of a pair of guide rails 68 and the auxiliary molding die 60 is fixed to the distal end portion of a pair of guide rails 70. The guide rails 68 are parallel to each other and movably supported by a plate 72 fixed to the molding die 28. The guide rails 70 are parallel to each other and movably supported by a plate 74 fixed to the molding die 30. In this way, as the pair of guide rails 68 is moved relative to the plate 72 and the pair of guide rails 70 is moved relative to the plate 74, the auxiliary molding dies 58 and 60 can be moved closer to or away from each other while the die-matching surfaces thereof are kept parallel.

Further, a hydraulic cylinder 76 is attached to the plate 72 and a hydraulic cylinder 78 is attached to the plate 74. An actuator rod 80 of the hydraulic cylinder 76 is connected to the auxiliary molding die 58 and an actuator rod 82 of the hydraulic cylinder 78 is connected to the auxiliary molding die 60. Accordingly, due to the operation of the hydraulic cylinders 76 and 78, the auxiliary molding die 58 projects from the die-matching surface of the molding die 28 and the auxiliary molding die 60 projects from the die-matching surface of the molding die 30 and thereby the cavities 62 can apply pressure to the resin parison P to form the bracket 12.

Next, FIG. 5 and 6 shows a perspective view of a specific process of the method of manufacturing resinous containers relating to the present embodiment. The specific process of the manufacturing method relating to the present embodiment will be explained accordingly.

When the washer tank 10 is molded, at first, a pre-molding process is implemented. Namely, as shown in FIG. 5A, the resin parison P serving as a molding material is extruded from the die head 22. The extruded resin parison P is hanged and stretched by its own weight. Next, as shown in FIG. 5B, the hydraulic cylinders 44 and 46 are operated to clamp the molding dies 28 and 30 and the resin parison P is put therebetween. Further, compressed air is blown from the blow pin 26 into the resin parison P while the mold clamping pressure applied to the molding dies 28 and 30 is maintained. In this way, the resin parison P is expanded within the cavity 52 of the molding dies 28 and 30 and fits to the engraved surfaces, which form the outline of the cavity 52, of the molding dies 28 and 30.

Moreover, when the compressed air is blown, the hydraulic cylinders 76 and 78 are operated to move and clamp the auxiliary molding dies 58 and 60 and thereby pressure is further applied to the resin parison P within the cavity 62.

Next, air within the molding dies 28 and 30 is discharged. Further, as shown in FIG. 5C, the hydraulic cylinders 44 and 46 are operated again to open the molding dies 28 and 30. In this way, a hollow body T (tank main body 10A) and the bracket 12, which are formed integrally with the resin parison P, are molded. Moreover, as shown in FIG. 5D, only the bracket 12 is cut out from the peripheral unnecessary resin parison P and the bracket 12 is completed. The pre-molding process ends in accordance with the above description. The hollow body T (and the cut-out piece of the peripheral resin parison P) molded in this pre-molding process is recycled.

Next, a main molding process will be implemented.

Figure 6A:
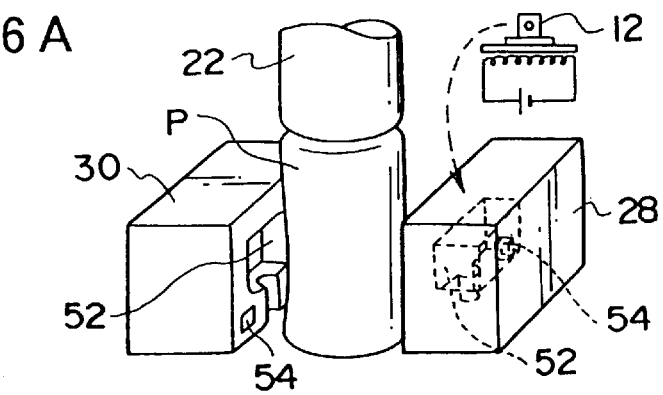
FIGS. 6A through 6D show specific processes of the method of manufacturing resinous containers relating to the embodiment of the present invention and are perspective views of a main molding process.
Figure 6B:
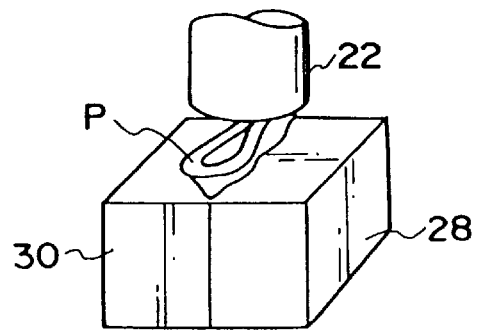

In the main molding process, as shown in FIG. 6A, the bracket 12, which has been formed in the aforementioned pre-molding process, is preheated. Thereafter, the bracket 12 is inserted and held in the holding portion 54 of the molding die 28, and the resin parison P is extruded and hanged from the die head 22 as mentioned above. Next, as shown in FIG. 6B, the hydraulic cylinders 44 and 46 are operated to clamp the molding dies 28 and 30 and the resin parison P is put therebetween. Further, compressed air is blown into the resin parison P from the blow pin 26 while the mold clamping pressure applied to the molding dies 28 and 30 is maintained. In this way, the resin parison P is expanded within the cavity 52 of the molding dies 28 and 30 and fits to the engraved surfaces, which form the outline of the cavity 52, of the molding dies 28 and 30. At the same time, the bracket 12 which is held in the holding portion 54 is integrated with the parison P. Moreover, when the compressed air is blown, the hydraulic cylinders 76 and 78 are operated to clamp the auxiliary molding dies 58 and 60 and thereby pressure is further applied to the resin parison P within the cavity 62.

Figure 6C:
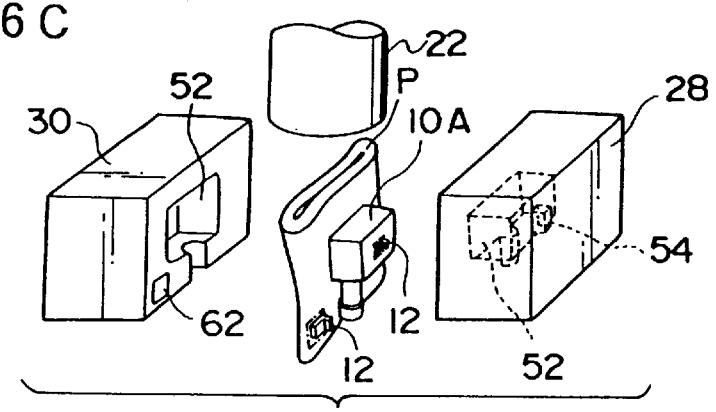
Figure 6D:
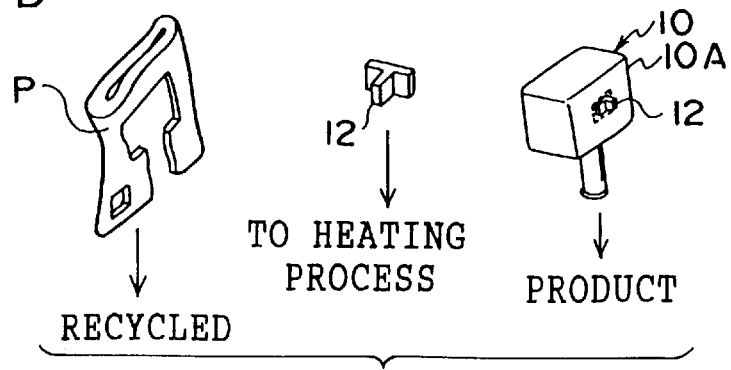

Next, air within the molding dies 28 and 30 is discharged. Moreover, as shown in FIG. 6C, the hydraulic cylinders 44 and 46 are operated again to open the molding dies 28 and 30. In this way, as shown in FIG. 2 as well, the washer tank 10, in which the bracket 12 is integrated with the tank main body 10A (the unnecessary resin parison P is also formed integrally therewith), and a new bracket 12 are molded. Further, as shown in FIG. 6D, the washer tank 10 and the bracket 12 are cut out from the peripheral unnecessary resin parison P. The main molding process at the first time ends in accordance with the above description.

Thereafter, as the bracket 12 which was molded through the first main molding process is used, the main molding process from the second time onward is successively and continuously performed at a plurality of times in the same way as mentioned above.

In this way, in the method of manufacturing resinous containers relating to the present embodiment, when the washer tank 10 is manufactured, the pre-molding process in which the bracket 12 serving as an auxiliary part (auxiliary body) is molded is implemented. Thereafter, the bracket 12 which has been formed through the pre-molding process is inserted and held in the molding die 28, and the tank main body 10A serving as a hollow body (main body) and a new bracket 12 are molded, and the held new bracket 12 is integrated with the tank main body 10A. In this way, the main molding process is implemented. Afterwards, the bracket 12 molded in the last main molding process is held in the molding die 28, and the main molding process is successively and continuously effected at a plurality of times.

Figure 7:
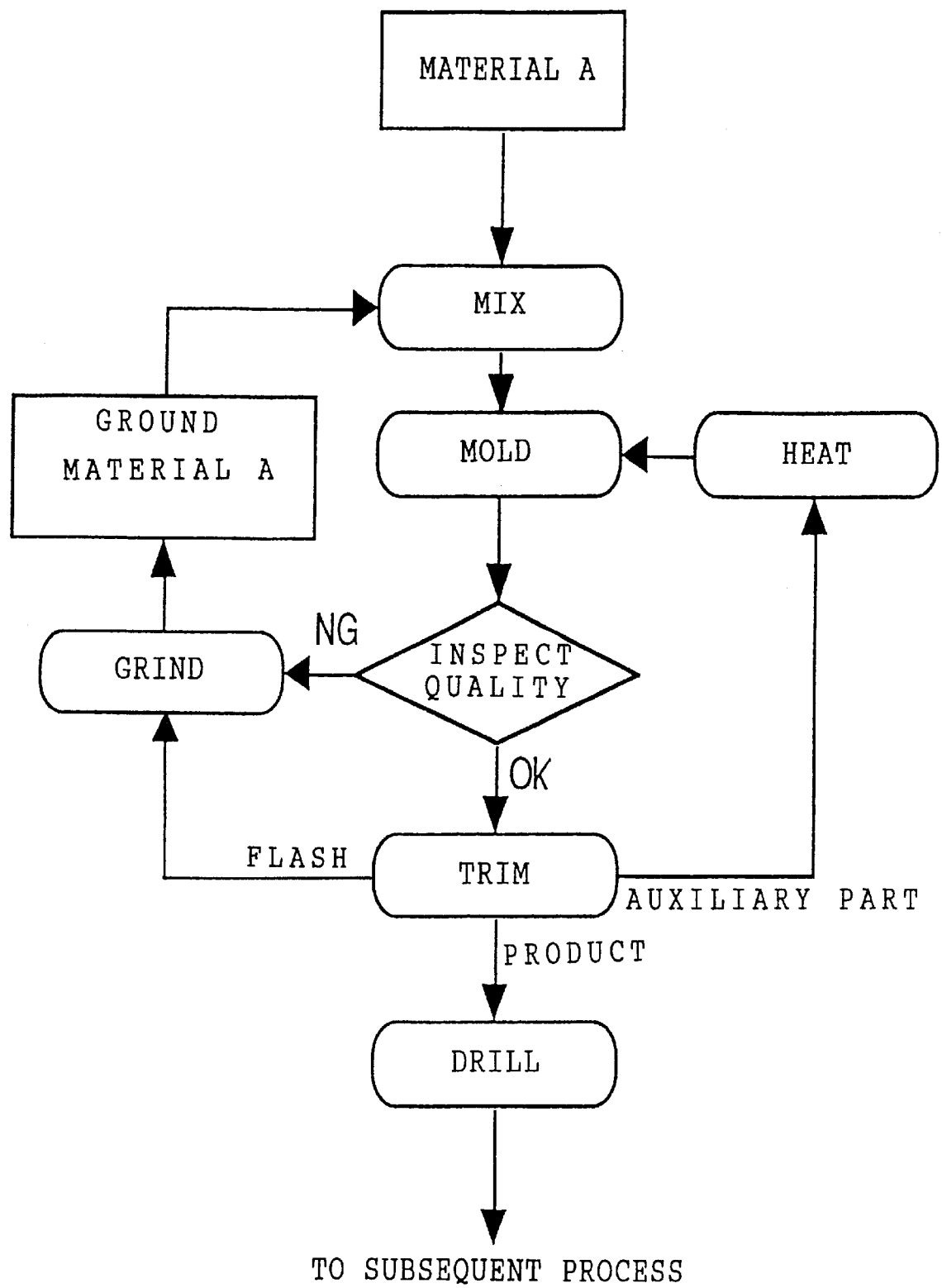
FIG. 7 is a flowchart which shows a manufacturing process of the method of manufacturing resinous containers relating to the embodiment of the present invention.
Figure 8:
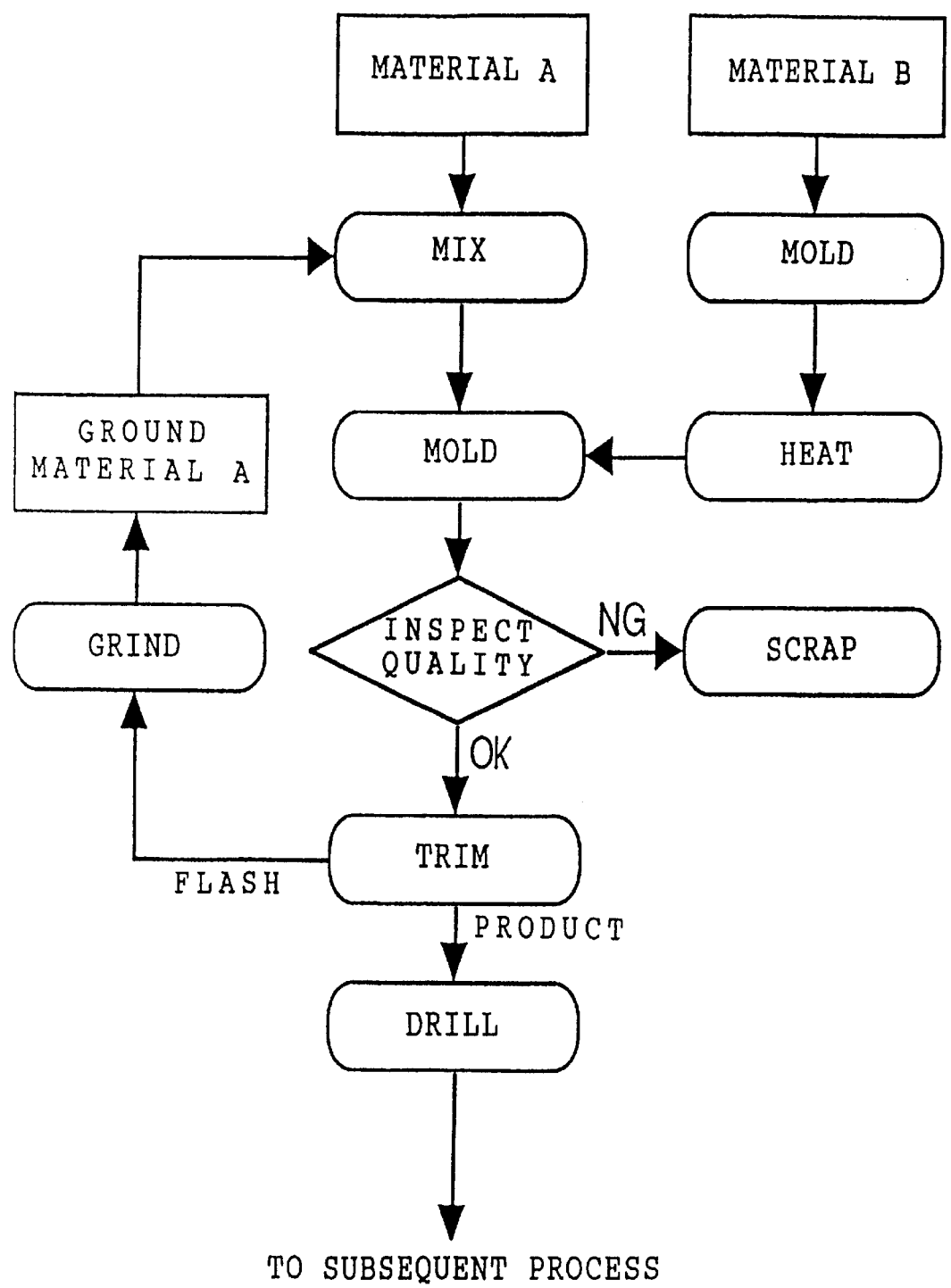
FIG. 8 is a flowchart which shows a manufacturing process according to a conventional manufacturing method.

Further, FIG. 7 shows a flowchart of the manufacturing process according to the method of manufacturing resinous containers relating to the present embodiment. On the other hand, FIG. 8 shows a flowchart of the manufacturing process according to a conventional manufacturing method. Both methods will be compared and explained.

When the washer tank 10 as mentioned above is manufactured, conventionally, as shown in FIG. 8, the bracket 12 is manufactured through injection molding, which is implemented separately from blow molding, with a resin material B. Further, the injection-molded bracket 12 is inserted and held in the holding portion of a molding die for blow molding and the hollow tank main body 10A is manufactured with a material A and integrated with the held bracket 12 through blow molding and thereby the tank 10 is completed as a product. The molded bracket 12 may be thermally melt-adhered (thermally press-adhered) to and integrated with the tank main body 10A in such a way that the tank 10 is completed as a product.

In this way, conventionally, because the bracket 12 is manufactured separately from the tank main body 10A in the separate process such as injection molding or the like, the molding die for injection molding and the manufacturing operation thereof are indispensable. Further, the number of the processes of manufacturing washer tanks and the cost of manufacturing are increased.

Furthermore, after the bracket 12 is integrated with the tank main body 10A to produce the tank 10 as a product, the quality of the product is inspected. Because the material of the bracket, which is manufactured through the separate process such as injection molding as mentioned above, is different from that of the tank main body 10A, the product which was determined as defective cannot be recycled without segregating the materials. Consequently, the cost of manufacturing is increased, and resources are not saved favorably (effective utilization and recycling of materials).

On the other hand, in accordance with the method of manufacturing resinous containers relating to the aforementioned present embodiment, the washer tank 10 and the bracket 12 are manufactured in the same (single) manufacturing line as shown in FIG. 7. Unlike the conventional manufacturing method, there is no need to manufacture the bracket 12 separately from the tank main body 10A in the separate process such as injection molding or the like. Therefore, the molding die for injection molding and the manufacturing operation thereof are not required. The number of the processes of manufacturing washer tanks and the cost of manufacturing washer tanks can be reduced.

Further, in the method of manufacturing resinous containers relating to the present embodiment, as shown in FIG. 7, the only resin material A for blow molding (i.e., the resin parison P) is used for molding the tank 10. Moreover, the washer tank 10 which was determined as defective when the quality thereof was inspected is recycled without segregation.

Namely, since the tank main body 10A and the bracket 12 are molded of the same material (the resin parison P) and faulty products can be recycled simply, the molding material (the resin parison P) is not wasted and the cost of manufacturing is reduced. Also, resources are effectively saved (effective utilization and recycling of materials).

Furthermore, in the method of manufacturing resinous containers relating to the present embodiment, the auxiliary molding dies 58 and 60 are provided at the segmental molding dies 28 and 30 which are a pair of male and female dies. When the molding dies 28 and 30 are clamped, pressure is applied to the resin parison P and a part of the resin parison P is pushed into the cavity 62 and then the bracket 12 is molded. In addition, pressure is applied again to the bracket 12 (the resin parison P within the cavity 62) by clamping the auxiliary molding dies 58 and 60. Accordingly, the product accuracy of the bracket 12 (the auxiliary part) is further improved.

In this way, in the method of manufacturing resinous containers relating to the present embodiment, the number of the manufacturing processes is reduced, materials can be effectively used, and the cost of manufacturing can be greatly reduce.

In the present embodiment, the bracket 12 for mounting the washer tank 10 at a vehicle body, which serves as an auxiliary part (auxiliary body), is molded by the auxiliary molding dies 58 and 60 (the cavities 62) provided in the land areas 56 which is the area other than the cavities 52 in the die-matching surfaces of the molding dies 28 and 30. Then, the bracket 12 is insert-molded and fixed integrally with the tank 10 (the tank main body 10A). However, the auxiliary part (auxiliary body) which is molded in the land areas 56 of the molding dies 28 and 30 is not limited to this.

Figure 9:
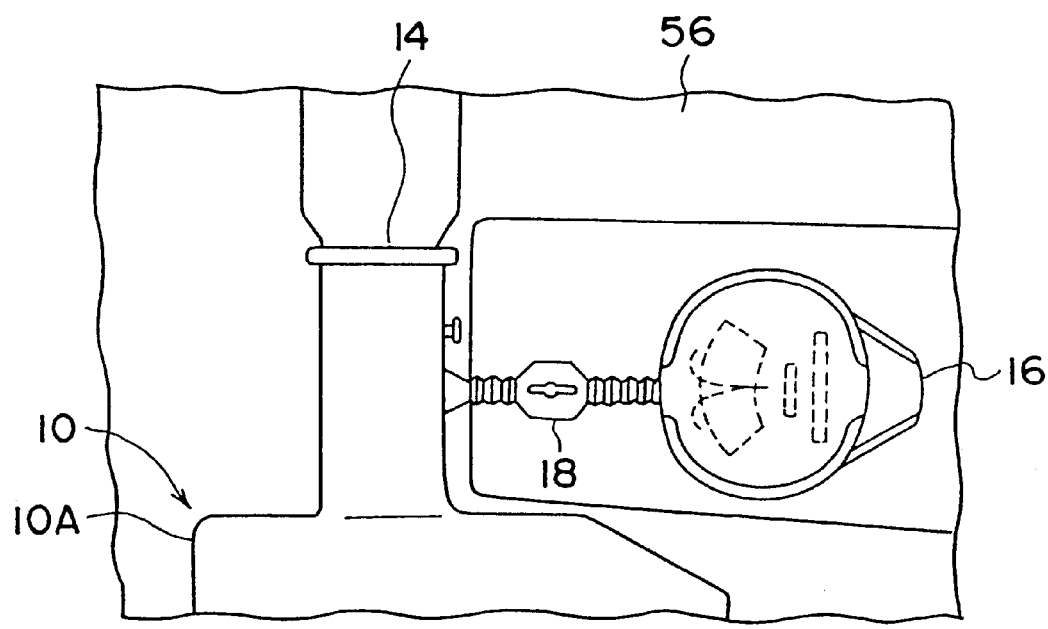
FIG. 9 is an elevational view which shows another example of an auxiliary part (auxiliary body) which is molded in the land area, which is the area other than a cavity for molding hollow bodies, of the die-matching surface of a molding die.

For example, as shown in FIG. 9, a cap 16 which is attached to the water supply opening 14 of the tank 10 can be molded in the land area 56. Further, in this case, the cap 16 can be molded integrally and continuously with the tank main body 10A, and a connecting portion 18 which connects the cap 16 and the tank main body 10A can be used as a connecting portion for preventing the falling of a cap.

Furthermore, in the present embodiment, the bracket 12 is molded by two auxiliary molding dies 58 and 60 and the hydraulic cylinders 76 and 78 (pressure-applying mechanism). However, only any one of the auxiliary molding dies and the hydraulic cylinders (pressure-applying mechanism) may be provided.

Moreover, the cavity 62 can be provided in at least one of the land areas 56 of the molding dies 28 and 30 in place of in the die-matching surfaces of the auxiliary molding dies 58 an 60 and the auxiliary molding dies can be omitted. In this case, the bracket 12 is molded by only clamping the molding dies 28 and 30.

Furthermore, in the case in which the auxiliary molding dies 58 and 60 are provided, the clamping of the auxiliary molding dies 58 and 60 can be implemented during, before, or after the compressed air is blown.

What is claimed is:

1. A method of manufacturing resinous containers comprising:

preparing segmental molding dies, said segmental molding dies comprising a first cavity for molding hollow bodies and a second cavity for molding auxiliary parts that is provided at a portion other than said first cavity in at least one of the die-matching surfaces of said segmental molding dies and a third cavity for holding an auxiliary part produced in said second cavity during a previous molding cycle and that communicates with said supplying a first cavity;

pre-molding by supplying resin parison between said segmental molding dies, clamping said segmental molding dies, blowing a compressed gas into said resin parison to expand said resin parison within said first cavity such that said resin parison is pressed against an inner surface of said first cavity, discharging said compressed gas from said resin parison, and opening said segmental molding dies to take out a formed hollow body and a formed auxiliary part; and main molding by inserting said formed auxiliary part in said third cavity, supplying the resin parison between said segmental molding dies, clamping said segmental molding dies, blowing a compressed gas into said resin parison to expand said resin parison within said first cavity such that said resin parison is pressed against an inner surface of said first cavity, discharging said compressed gas from said resin parison, and opening said segmental molding dies to take out a new auxiliary part and a resin container in which said inserted auxiliary part is integrated with a hollow body, wherein when once said pre-molding step is implemented, said preparing step and said main molding step are repeated.

2. A method of manufacturing resinous containers according to claim 1, wherein said segmental molding dies are comprised of a pair of dies, one male and one female.

3. A method of manufacturing resinous containers according to claim 2, wherein said second cavity is provided in one of said male and female dies.

4. A method of manufacturing resinous containers according to claim 2, wherein said second cavity is provided in both of said male and female dies.

5. A method of manufacturing resinous containers according to claim 1, wherein said segmental molding dies are comprised of a pair of dies, one male and one female, and at lest one auxiliary molding die, said male and female dies comprising said first cavity and an opening provided at a portion other than said first cavity of said die-matching surfaces, and said auxiliary molding die comprising said second cavity and being disposed movably in said opening, wherein said auxiliary molding die is pressed against said resin parison to form auxiliary parts.

6. A method of manufacturing resinous containers according to claim 5, wherein said opening is provided on one of said male and female dies and said auxiliary molding die is comprised of a single die.

7. A method of manufacturing resinous containers according to claim 5, wherein said opening is provided on both of said male and female dies and said auxiliary molding die is comprised of a pair of dies.

8. A method of manufacturing resinous containers according to claim 1, wherein said auxiliary parts are brackets.

9. A method of manufacturing resinous containers according to claim 1, wherein said auxiliary parts are caps.

10. A method of manufacturing resinous containers according to claim 1, wherein said resinous containers are washer tanks for a vehicle.

* * * * *